(12) United States Patent  
Choi et al.

(10) Patent No.: US 9,100,842 B2  
(45) Date of Patent: Aug. 4, 2015

(54) APPARATUS AND METHOD FOR SUPPORTING CALIBRATION FOR RADIO FREQUENCY CIRCUIT IN COMMUNICATION DEVICE

(71) Applicant: Samsung Electronics Co. Ltd., Suwon-si, Gyeonggi-do (KR)

(72) Inventors: Won-Suk Choi, Seongnam-si (KR); In-Yup Kang, San Diego, CA (US); Si-Bun Jun, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 13/766,214

(22) Filed: Feb. 13, 2013

(65) Prior Publication Data

US 2013/0210369 A1 Aug. 15, 2013

(30) Foreign Application Priority Data

Feb. 13, 2012 (KR) ........................ 10-2012-0014273

(51) Int. Cl.
| | |
|---|---|
| *H04B 17/00* | (2006.01) |
| *H04B 1/10* | (2006.01) |
| *H04W 24/00* | (2009.01) |
| *H04W 24/02* | (2009.01) |
| *H04B 17/11* | (2015.01) |

(52) U.S. Cl.
CPC ............... *H04W 24/00* (2013.01); *H04B 17/11* (2015.01); *H04W 24/02* (2013.01)

(58) Field of Classification Search
CPC .......... H04B 17/0005; H04B 17/0062; H04W 24/00; H04W 24/02
USPC ........ 455/67.11, 284, 305, 296, 67.13–67.14, 455/115.1–115.2, 226.1
See application file for complete search history.

(56) References Cited

U.S. PATENT DOCUMENTS

| | | | |
|---|---|---|---|
| 2005/0059367 A1 | 3/2005 | Kim | |
| 2006/0009180 A1* | 1/2006 | Xu et al. | 455/226.1 |
| 2006/0063503 A1* | 3/2006 | Brekelmans | 455/290 |
| 2006/0068739 A1* | 3/2006 | Maeda et al. | 455/295 |
| 2007/0080835 A1* | 4/2007 | Maeda et al. | 341/120 |
| 2008/0318537 A1* | 12/2008 | Dhamankar et al. | 455/193.1 |
| 2010/0022208 A1* | 1/2010 | Cole et al. | 455/114.3 |
| 2010/0318310 A1* | 12/2010 | Thomas | 702/107 |
| 2011/0142113 A1 | 6/2011 | Hokazono et al. | |
| 2011/0258426 A1* | 10/2011 | Mujtaba et al. | 713/2 |
| 2011/0275340 A1* | 11/2011 | Kawabe et al. | 455/313 |
| 2012/0250534 A1* | 10/2012 | Langer et al. | 370/252 |
| 2013/0235962 A1* | 9/2013 | O'Keefe et al. | 375/371 |
| 2013/0265139 A1* | 10/2013 | Nummila et al. | 340/10.1 |

\* cited by examiner

*Primary Examiner* — Simon Nguyen  
(74) *Attorney, Agent, or Firm* — Jefferson IP Law, LLP (57) ABSTRACT

A method for calibration for a Radio Frequency (RF) circuit in a communication device is provided. The method includes performing an independent RF-circuit calibration, storing calibration data generated through the calibration, in an external storage unit, and downloading, to the communication device, partial calibration data among the calibration data stored in the external storage unit.

30 Claims, 7 Drawing Sheets

APPARATUS AND METHOD FOR SUPPORTING CALIBRATION FOR RADIO FREQUENCY CIRCUIT IN COMMUNICATION DEVICE

PRIORITY

This application claims the benefit under 35 U.S.C. §119 (a) of a Korean patent application filed on Feb. 13, 2012 in the Korean Intellectual Property Office and assigned Serial No. 10-2012-0014273, the contents of which are herein incorporated by reference.

BACKGROUND OF THE INVENTION

1. Field of the Invention

The present invention relates to a communication device. More particularly, the present invention relates to calibration in a communication device.

2. Description of the Related Art

In recent years, there is a trend of supporting multi-band and multi-mode, and concurrently minimizing cost and power consumption, in a mobile communication system. To meet this trend, a transceiver structure of a Mobile Station (MS) may use a direct conversion scheme. A transceiver employing the direct conversion scheme has a simple structure, and has an advantageous feature in size and cost, and has a reconfigurable structure that is easy to use. However, the direct conversion scheme has a characteristic of being sensitive to circuit impairment such as In-phase/Quadrature-phase (IQ) mismatch, Transmitter Local Oscillator (TX LO) feedthrough, RX Direct Current (DC)-offset and the like. The imperfection of the aforementioned Radio Frequency (RF) processing means is one cause of transceiver performance deterioration. Accordingly, calibration is performed to compensate for the aforementioned imperfection.

Also, as the commercialization of a next-generation system having a high data rate makes progress, a transceiver supporting the high data rate is being developed. To provide the high data rate, the transceiver requires lower Error Vector Magnitude (EVM) performance than a legacy system. To meet the low EVM, a distortion of the transceiver generated while a signal goes through the whole system should be minimized. The distortion of the transceiver results in the deterioration of a Signal to Noise Ratio (SNR) of a signal. Mostly, the distortion of the transceiver is generated while a signal goes through an analog and RF circuit. In order to remove the impairment of the analog and RF circuit to guarantee performance, calibration for the analog and RF circuit is performed.

In general, the calibration for the analog and RF circuit is controlled in a digital block processing a digital signal. For instance, the digital block includes a modulator/demodulator (modem). For example, the calibration for the analog and RF circuit is carried out by a control signal from the modem, in a state where the analog and RF circuit and the modem interwork with each other. In this case, it is difficult to achieve an accurate measurement for analog and RF circuit performance, because self-calibration of a chip level including the analog and RF circuit is not performed. Accordingly, when the analog and RF circuit goes beyond a performance difference assumed as a margin upon interworking with the modem, in other words, when the calibration for the analog and RF circuit is performed in a situation where the analog and RF circuit and the modem interwork with each other, there is a possibility that a situation occurs in which the performance of the analog and RF circuit does not meet the required system standard. Also, the calibration for the analog and RF circuit performed in a state where the analog and RF circuit and the modem interwork with each other consumes a relatively higher cost than a test at a chip level.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide an apparatus and method for reducing a cost for calibration in a communication device.

Another aspect of the present invention is to provide an apparatus and method for performing effective calibration for a Radio Frequency (RF) circuit in a communication device.

A further aspect of the present invention is to provide an apparatus and method for performing effective calibration for an RF circuit before the RF circuit and a modulator/demodulator (modem) interwork with each other in a communication device.

Yet another aspect of the present invention is to provide an apparatus and method for performing calibration of a chip level in a communication device.

Still another aspect of the present invention is to provide an apparatus and method for transceiving a signal by using result data of a calibration carried out at a chip level in a communication device.

Still another aspect of the present invention is to provide an apparatus and method for performing calibration supporting a multi-band in a communication device.

Still another aspect of the present invention is to provide an apparatus and method for exchanging result data of calibration with an external server in a communication device.

Still another aspect of the present invention is to provide an apparatus and method for providing only data corresponding to a mode supported by a Mobile Station (MS) among result data of calibration stored in an external server, in a communication device.

The above aspects are addressed by providing an apparatus and method for supporting calibration for an RF circuit in a communication device.

In accordance with one aspect of the present invention, a method of calibration for an RF circuit in a communication device is provided. The method includes performing an independent RF-circuit calibration, storing calibration data generated through the calibration, in an external storage unit, and downloading, to the communication device, partial calibration data among the calibration data stored in the external storage unit.

In accordance with another aspect of the present invention, a method of calibration for an RF circuit in a communication device is provided. The method includes generating calibration data for a plurality of frequency bands through calibration, and providing the calibration data for the plurality of frequency bands, to an external storage unit.

In accordance with a further aspect of the present invention, a method of managing calibration data for a communication device is provided. The method includes receiving calibration data for a plurality of frequency bands, storing the received calibration data, and providing calibration data for a partial frequency band among the calibration data.

In accordance with yet another aspect of the present invention, a method of calibration for an RF circuit in a communication device is provided. The method includes downloading calibration data from an external storage unit, and determining additional calibration data through a calibration, in a state where the RF circuit having applied the calibration data and a modem interwork with each other.

In accordance with still another aspect of the present invention, an operation method of a communication device is provided. The method includes retrieving at least one compensation value corresponding to an operation state from calibration data that is determined through a calibration implemented independently by an RF circuit provided in the communication device and, by using the compensation value, controlling at least one of a magnitude and a phase of at least one of a transmission signal and a reception signal to compensate for a distortion generated in the RF circuit.

In accordance with still another aspect of the present invention, a communication device is provided. The device includes an RF circuit and a modem. The RF circuit performs an independent RF-circuit calibration, and stores calibration data generated through the calibration, in an external storage unit. The modem downloads, to the communication device, partial calibration data among the calibration data stored in the external storage unit.

In accordance with still another aspect of the present invention, an RF circuit apparatus in a communication device is provided. The apparatus includes a controller and an output unit. The controller generates calibration data for a plurality of frequency bands through a calibration. The output unit provides the calibration data for the plurality of frequency bands, to a server.

In accordance with still another aspect of the present invention, an apparatus for managing calibration data for a communication device is provided. The apparatus includes a storage unit and a communication unit. The storage unit stores calibration data for a plurality of frequency bands. The communication unit receives the calibration data, and for transmitting calibration data for a partial frequency band among the calibration data.

In accordance with still another aspect of the present invention, a modem apparatus for a communication device is provided. The apparatus includes a storage unit and a controller. The storage unit stores calibration data downloaded from an external server. The controller determines additional calibration data through a calibration, in a state where a RF circuit having applied the calibration data and the modem interwork with each other.

In accordance with still another aspect of the present invention, a communication device is provided. The device includes a storage unit and a controller. The storage unit stores calibration data that is determined through a calibration implemented independently of an RF circuit provided in the communication device. The controller retrieves at least one compensation value corresponding to an operation state from the calibration data and, by using the compensation value, controls at least one of a magnitude and a phase of at least one of a transmission signal and a reception signal to compensate for a distortion generated in the RF circuit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A technology for calibration for a Radio Frequency (RF) circuit in a communication device is described herein.

Herein, an effective calibration technique applicable to an RF circuit is proposed. The RF circuit can be referred to as an 'RF Integrated Circuit (RFIC)'. In detail, through two-step processes, calibration according to an exemplary embodiment of the present invention minimizes a calibration procedure to be carried out in a state of interworking with a modulator/demodulator (modem). That is, most processes of calibration are carried out as RF circuit self-calibration, i.e., an independent RF-circuit calibration and therefore, the calibration is performed in an RF-circuit chip state in which the RF circuit is not installed in a Mobile Station (MS). According to this, testing the performance of the RF circuit is carried out before the RF circuit interworks with the modem, thereby decreasing the uncertainty for the performance of the RF circuit and reducing a calibration procedure for the MS, which would incur a relatively high cost for testing. A calibration according to an exemplary embodiment of the present invention is described below in detail.

Figure 1:
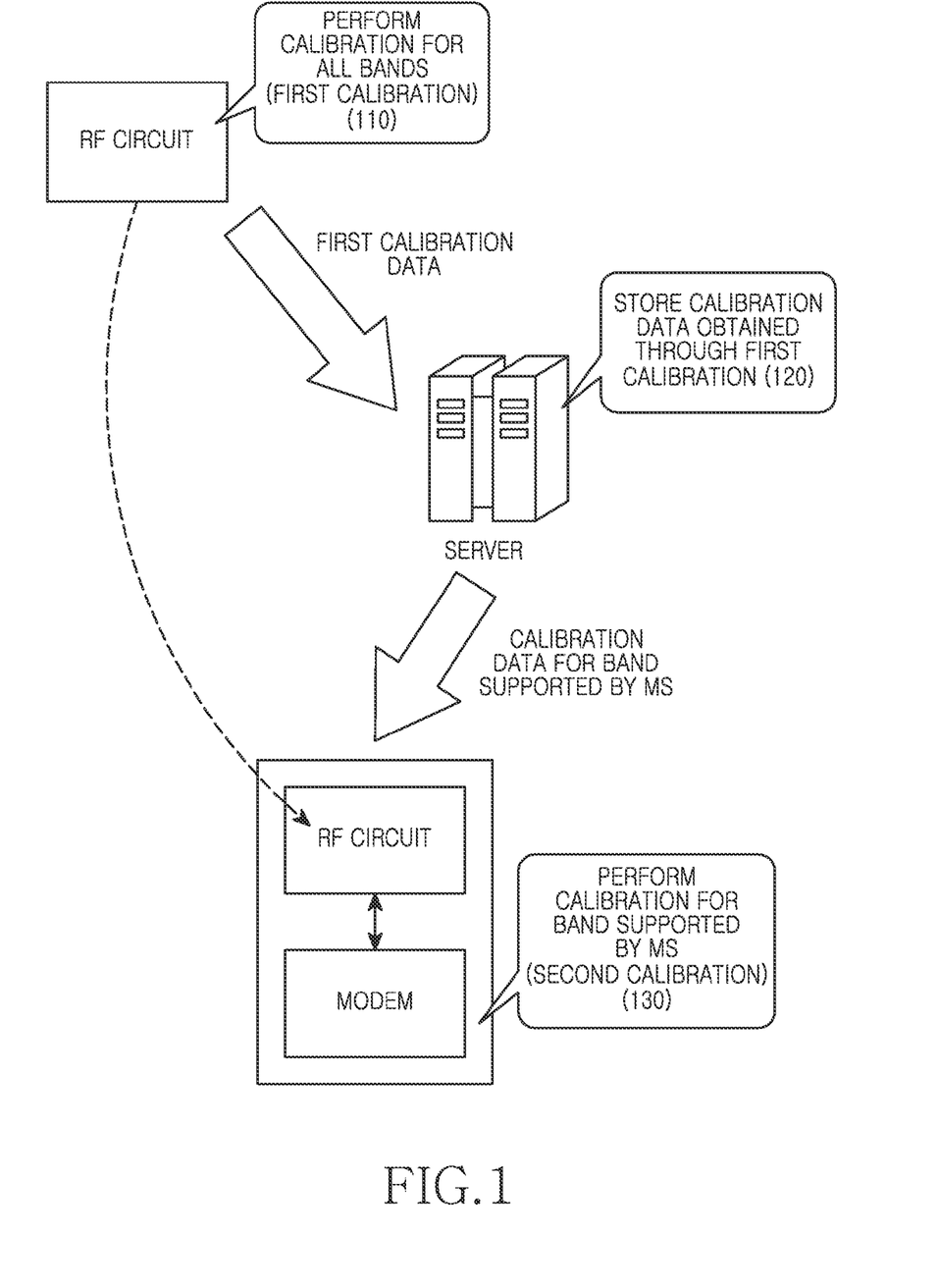
FIG. 1 is a diagram conceptually illustrating calibration in a communication device according to an exemplary embodiment of the present invention.

FIG. 1 conceptually illustrates calibration in a communication device according to an exemplary embodiment of the present invention.

Referring to FIG. 1, calibration according to an exemplary embodiment of the present invention includes a first calibration step 110 and a second calibration step 130 and further, includes a step 120 of storing calibration data determined through the first calibration step 110. The first calibration step 110 is a calibration implemented in a chip state of no interworking with a modem, and the second calibration step 130 is a calibration implemented in a state of interworking with the modem. That is, the first calibration step 110 is performed in a state where an RF circuit is not connected with other circuits (e.g., the modem) included in the communication device. The first calibration step 110 includes calibration for frequencies of all bands supported by the communication device. In detail, the first calibration step 110 includes calibration of predefined items for constituent elements of the RF circuit in each of all frequency bands. For example, the calibration of the predefined items can include a calibration for at least one of Transmitter/Receiver (TX/RX) gain step error, TX/RX In-phase/Quadrature-phase (IQ) mismatch, TX Local Oscillator (LO) feed-through, RX Direct Current (DC)-offset, a Voltage Controlled Oscillator (VCO), etc.

Next, the step 120 of storing the calibration data determined through the first calibration step 110 in a separate external server is performed. Here, the calibration data includes correction values for distortion. The calibration data stored in the external server includes calibration data for all frequency bands. The external server includes a communication unit for transceiving the calibration data with the external server and a storage unit for storing the calibration data. The communication unit receives the calibration data through a wired interface or a wireless interface. According to an exemplary embodiment of the present invention, the external server can be implemented in various forms. For example, the external server can be implemented using a Personal Computer (PC), a flash memory, a Universal Serial Bus (USB) memory and the like.

The second calibration step 130 includes calibration for a frequency of at least one band supported by an MS in which the RF circuit is to be installed. For the sake of the second calibration step 130, only calibration data for at least one band supported by the MS among the calibration data for all frequency bands stored in the external server is downloaded to the MS, and calibration for the entire MS is performed in a state where the downloaded calibration data is applied to the RF circuit. Most of the calibration is completed through the first calibration step 110, and the second calibration step 130 takes a scheme of seeking an offset value for correcting a difference between a measurement value of a chip alone and a measurement value of the entire MS.

An aspect of the present invention is to reduce a measurement time in a state of interworking with a modem, through the aforementioned process. Also, according to an exemplary embodiment of the present invention, Error Vector Magnitude (EVM) and spectrum mask characteristics of the RF circuit are accurately measured after calibration for TX/RX IQ mismatch, TX/RX DC-offset and the like on a chip of an RF circuit is completed. Therefore, uncertainty is reduced compared to a related-art scheme of measuring the EVM characteristic and the like of the RF circuit after interworking with the modem.

For the sake of the first calibration step 1110 described above with reference to FIG. 1, the RF circuit can be constructed as described below.

Figure 2:
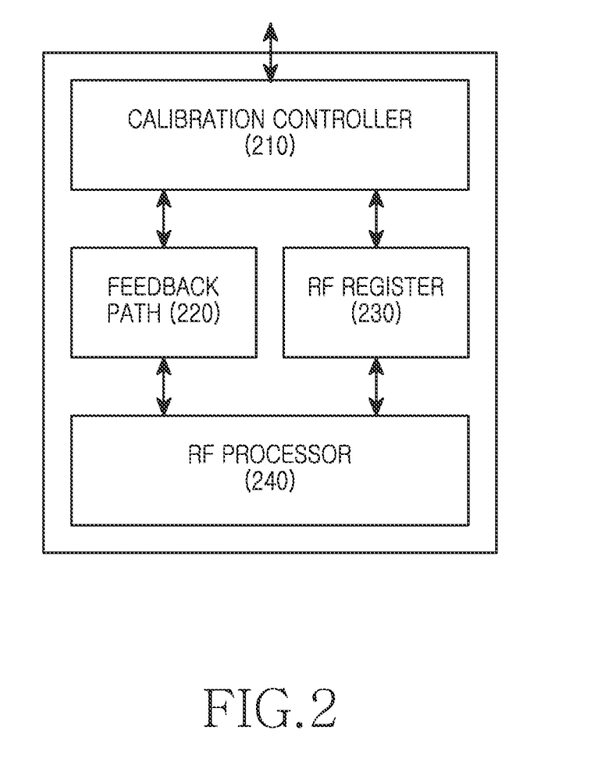
FIG. 2 is a block diagram illustrating a construction of a Radio Frequency (RF) circuit in a communication device according to an exemplary embodiment of the present invention.

FIG. 2 is a block diagram illustrating a construction of an RF circuit in a communication device according to an exemplary embodiment of the present invention.

Referring to FIG. 2, the RF circuit includes a calibration controller 210, a feedback path 220, an RF register 230, and an RF processor 240. The calibration controller 210 generates a reference signal for calibration, and analyzes the reference signal. The reference signal denotes an input signal for observing an output result of the RF processor 240. For example, the reference signal, which is a transmission signal, a reception signal, or a control signal, can be provided to the RF processor 240. And, the calibration controller 210 generates calibration data by using the analysis result on the reference signal. Here, the calibration data includes compensation values for distortion.

The feedback path 220 provides the calibration controller 210 with a result of processing the reference signal in the RF processor 240. For example, if the reference signal is provided as a transmission signal, a value after the reference signal passes through a transmission path is provided to the calibration controller 210 through the feedback path 220. Or, if the reference signal is provided as a reception signal, a value after the reference signal passes through a reception path is provided to the calibration controller 210 through the feedback path 220. Or, if the reference signal is provided as a control signal, a signal generated due to an operation of an RF element controlled by the reference signal is provided to the calibration controller 210 through the feedback path 220.

According to an instruction of the calibration controller 210, the RF register 230 generates a physical signal controlling RF elements included in the RF processor 240. The RF processor 240 performs RF processing for a transmission signal or a reception signal. For example, the RF processor 240 performs at least one of analog-digital conversion, digital-analog conversion, filtering, mixing, and gain control. In other words, the RF processor 240 includes at least one of an oscillator, a mixer, an amplifier, a gain control element, a Digital to Analog Converter (DAC), an Analog to Digital Converter (ADC), and a filter. For example, a transmission path can include the DAC, the filter, the mixer, the gain control element and the like and, among them, the DAC to the mixer are constructed by two paths of an In-phase (I) channel and a Quadrature-phase (Q) channel. Also, a reception path can include the gain control element, the mixer, the filter, the ADC and the like and, among them, the mixer to the ADC are constructed by two paths of an I channel and a Q channel. The RF circuit can further include, although not illustrated in FIG. 2, an output unit for providing the calibration data to an external server.

According to an exemplary embodiment of the present invention, the first calibration can be carried out as described below.

Self-calibration on a chip of an RF circuit minimizes the use of an external equipment to shorten a required time. Because the external equipment is not used, generation and analysis of a signal for calibration are performed through a control block within the RF circuit. Here, the control block can be constructed as a digital circuit. For example, the control block includes the calibration controller 210 of FIG. 2.

The first calibration, which is a step of correcting a characteristic of the RF circuit and measuring the performance of the RF circuit, is carried out on the chip of the RF circuit.

Figure 3:
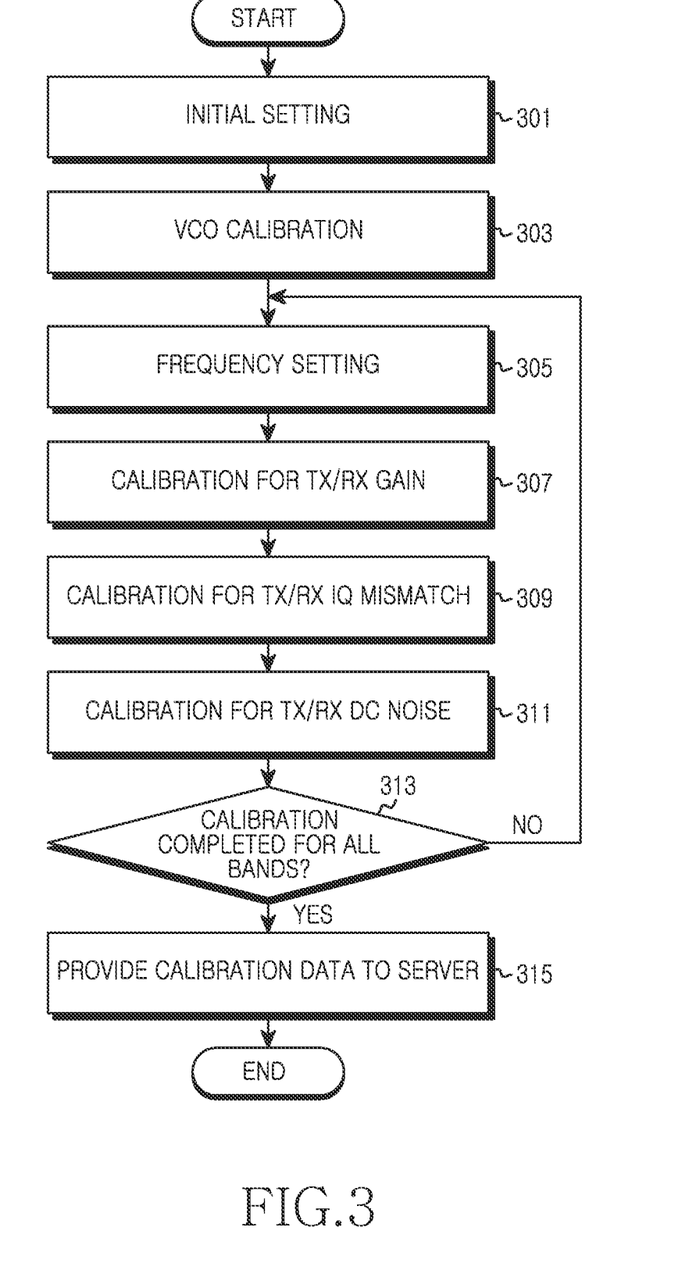
FIG. 3 is a flowchart illustrating a first calibration procedure in a communication device according to an exemplary embodiment of the present invention.

FIG. 3 illustrates a first calibration procedure in a communication device according to an exemplary embodiment of the present invention.

Referring to FIG. 3, in step 301, an initial setting is carried out. The initial setting is a process of supplying power, a bias current and the like such that elements becoming calibration targets can operate. That is, before calibration is performed, a predefined bias current value is supplied to each analog and RF circuit.

After the initial setting is completed, in step 303, calibration for a VCO is carried out. Here, the calibration for the VCO includes calibration for a transmission VCO and calibration for a reception VCO. For instance, the calibration for the VCO can be carried out as follows. The VCO outputs a reference signal, e.g., a frequency signal corresponding to an inputted voltage value. The frequency signal can include at least one of a square wave, a triangular wave, a sawtooth wave, a sine wave, etc. Therefore, the control block inputs a specific voltage value to the VCO, and determines whether an intended frequency signal is output. If the determination result is that the intended frequency signal and an outputted frequency signal are different from each other, the control block determines at least one compensation value for an inputted voltage value corresponding to a distortion of the outputted frequency signal.

If the calibration for the VCO is completed, in step 305, a frequency for performing calibration for a TX/RX path is set. The RF circuit can be used in a plurality of frequency bands. According to the frequency bands, a distortion and noise characteristic needing calibration can appear different. In which frequency band an RF circuit is used after the RF circuit is installed in an MS is different according to which frequency band the MS supports. However, because the first calibration process is performed as independent RF-circuit calibration, it cannot be known whether the RF circuit is installed in an MS supporting which frequency band. Therefore, the first calibration is carried out for all frequency bands. As a result, calibration for each frequency band is iteratively performed. Therefore, the control block selects one frequency band for performing calibration. However, according to another exemplary embodiment of the present invention, only calibration for a partial frequency band can be carried out, if a frequency band to be supported by the RF circuit can be specified before the RF circuit is installed in the MS.

After the frequency is set, calibration of predefined items is performed for a transmission path and a reception path through step 307 to step 311, which is described below. According to an exemplary embodiment of the present invention, the sequence of operations of steps included in step 307 to step 311 described below can be different.

In step 307, calibration for transmission and reception gains is performed. In detail, calibration is performed for a maximum gain of the RF circuit and also, calibration is performed for matching a gain variance by a gain step defined for each gain control element within the RF circuit with a variance on design. For instance, for the sake of the calibration for the maximum gain, the control block grants a control signal for allowing the gain control element to grant the maximum gain, and determines if a maximum gain according to design is granted. If the result of the determination is that the intended maximum gain and a granted gain are different from each other, the control block determines at least one compensation value corresponding to an amount of difference for a transmission signal or a reception signal. Here, the control signal of the gain control element can be referred to as a 'control word'. For example, for the sake of the calibration for the gain variance by gain step, the control block changes a control signal of each gain control element, provides a reference signal, and determines if a gain according to design is granted. If the determination result is that the intended gain and a granted gain are different from each other, the control block determines at least one compensation value corresponding to an amount of difference for a transmission signal or a reception signal. In the case of a transmission gain, the compensation value can be a pre-compensation value applied before being supplied to an analog and RF circuit and, in the case of a reception gain, the compensation value can be a post-compensation value applied after the reception signal is digitized.

In step 309, calibration for TX/RX IQ mismatch is performed. For example, the control block outputs reference signals to each of an I-channel path and a Q-channel path, and determines the matching or mismatching of the reference signals passing through each of the I-channel path and the Q-channel path. For example, the control block can analyze signals mixed after passing through the I-channel path and Q-channel path and, in the analysis result, determine the matching or mismatching through the generation or non-generation of a signal of a specific frequency representing the TX/RX IQ mismatch. For example, the analysis can include envelope detection. If the mismatch occurs, the control block determines at least one compensation value corresponding to the amount of mismatch for a transmission signal or a reception signal. The compensation value can include at least one of a phase value and a magnitude value for an I-channel signal or a Q-channel signal.

In step 311, calibration for a DC noise is performed. The calibration for the DC noise includes calibration for TX LO feed-through and calibration for RX DC-offset. The TX LO feed-through and the RX DC-offset represent a distortion adding a DC component noise in a signal processing process. For example, the control block outputs a reference signal, and determines the addition or non-addition of a DC noise. For example, to measure the TX LO feed-through, the control block can analyze a signal passing through a transmission path and, in the analysis result, determine the addition or non-addition of a DC noise through the generation or non-generation of a signal of a specific frequency representing the DC noise. For example, the analysis can include envelope detection. Also, to measure the RX DC-offset, the control block can analyze a signal passing through a reception path and, in the analysis result, determine the addition or non-addition of the DC noise through the generation or non-generation of a signal of a specific frequency representing the DC noise. If a DC noise is generated, the control block determines at least one compensation value corresponding to the DC noise for a transmission signal or a reception signal.

After the calibration of each item for the set frequency band of step 305 is completed in step 311, in step 313, it is determined whether calibration for all bands are completed. If the calibration for all bands is not completed, in other words, if an RF frequency not calibrated remains, step 305 and the subsequent steps are again performed. For example, after changing the frequency band setting as much as $\Delta f$ in step 305, the control block repeats subsequent step 307 to step 311. Step 305 to step 311 are repeated for each frequency band and, by doing so, calibration data for all modes and all bands supported by the RF circuit are acquired. Whenever calibration for each frequency band is completed, calibration data can be stored in the form of a Look Up Table (LUT).

If it is determined in step 313 that the calibration for all bands is completed, in step 315, calibration data for all bands are provided to an external server. At this time, in order to identify and index the RF circuit within the external server, the calibration data can be provided along with identification information of the RF circuit. For the sake of this, the RF circuit can have a memory recording the identification information.

According to an exemplary embodiment of the present invention, the resulting value of the first calibration can be managed as follows. Calibration data determined through the first calibration includes resulting values for all standards, all bands, and all modes. But, an MS is not designed to always support all bands. That is, a communication standard supported by the MS is fixed, and a supported band and mode can be different for every MS. In this case, if all calibration data determined through the first calibration are stored in a memory within a modem or RF circuit, even calibration data for a mode and a band not supported by the MS are stored. This causes a waste of memory due to the storing of unnecessary data and, as a result, becomes the cause of increasing a size of the modem or RF circuit. Particularly, if the modem or the RF circuit uses a non-volatile memory, the size increase becomes a bigger problem. As the kinds of the communication standards, the modes, and the bands supported by the RF circuit are increased, the extent of the size increase is increased accordingly. To fix the aforementioned data storage problem, the present exemplary embodiment uses the external server.

Figure 4:
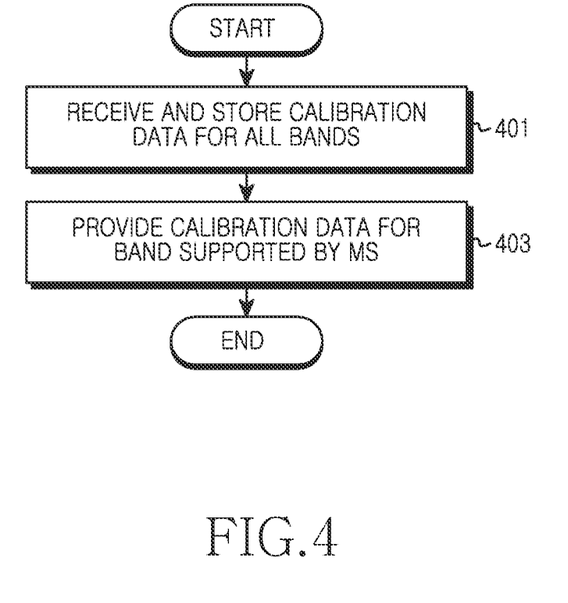
FIG. 4 is a flowchart illustrating a procedure of managing calibration data in a communication device according to an exemplary embodiment of the present invention.

FIG. 4 illustrates a procedure of managing calibration data in a communication device according to an exemplary embodiment of the present invention.

Referring to FIG. 4, in step 401, a server receives and stores calibration data for all bands. The calibration data for all bands are determined in an RF circuit chip self-measurement process through the aforementioned first calibration. That is, resulting values for all standards, all modes, and all bands determined in the RF circuit chip self-measurement process through the first calibration are stored in the server.

After that, in step 403, the server provides calibration data for at least one band supported by the communication device. That is, the server provides the calibration data for at least one band to the communication device. In other words, calibration data for a standard, a mode, and a band supported by the communication device in which an RF circuit is to be installed are downloaded from the server to the communication device. That is, after the server determines inputted identification information of an RF circuit and information indicating a selected band, the server outputs calibration data for the selected band among the determined calibration data of the RF circuit. Here, the information indicating the band can be replaced with information indicating a standard or information indicating a mode. For example, as the server receives a request from the communication device, the server can output calibration data for at least one band. For another example, according to a user's instruction through an input means, the server can output calibration data for at least one band.

According to an exemplary embodiment of the present invention, the second calibration can be carried out as follows. In the second calibration, the calibration data determined through the first calibration is used as raw calibration data for the chip. That is, the second calibration is performed in a state of storing only calibration data for a band supported by the communication device among the raw calibration data. According to this, it is not required to store measurement values for all bands in a memory of the communication device and thus, a memory size of the communication device can be reduced. A difference between the first calibration and the second calibration generated after an RF circuit chip is installed in the communication device is measured and, by using the measured difference between the first calibration and the second calibration, an offset value for the first calibration is determined.

Figure 5:
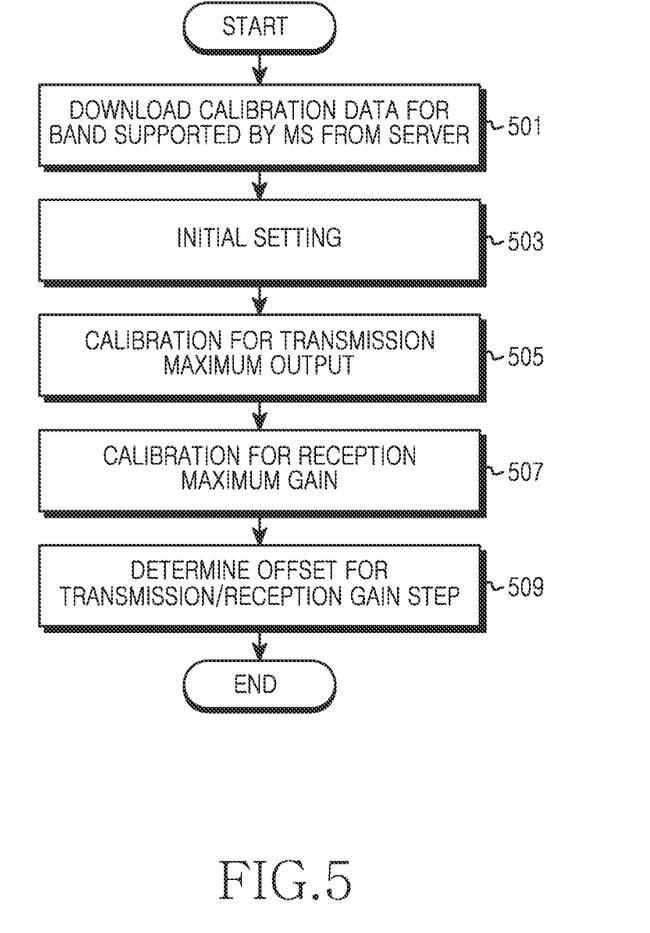
FIG. 5 is a flowchart illustrating a second calibration procedure in a communication device according to an exemplary embodiment of the present invention.

FIG. 5 illustrates a second calibration procedure in a communication device according to an exemplary embodiment of the present invention.

Referring to FIG. 5, in step 501, calibration data for at least one band supported by the communication device is downloaded from a server. For example, for the sake of the download, the communication device can send a request for the calibration data to the server. In detail, the communication device determines identification information of an installed RF circuit, and outputs the identification information of the RF circuit and information indicating a band to the server. Here, the information indicating the band can be replaced with information indicating a standard or information indicating a mode. For another example, the download can be triggered according to a request from a device other than the communication device or according to a user's instruction through an input means of the server.

After the calibration data for the at least one band is downloaded in step 501, in step 503, initial setting is performed. The initial setting is a process of supplying power, a bias current and the like such that elements becoming calibration targets can operate. That is, before calibration is performed, a predefined bias current value is supplied to each analog and RF circuit.

After the initial setting is completed in step 503, in step 505, calibration for transmission maximum output is performed. At this time, the calibration is performed in a state where the calibration data downloaded from the external server is applied to the RF circuit. In detail, a transmission maximum output value of a state where an RF circuit and a modem interwork with each other is measured, and the measured transmission maximum output value is compared with a transmission maximum output value measured on a chip. If there is a difference between the two transmission maximum output values, calibration data for correcting the difference is determined. Next, in step 507, calibration for a reception maximum gain is performed. That is, a reception maximum gain value of a state where the RF circuit and the modem interwork with each other is measured, and the measured reception maximum gain value is compared with a reception maximum gain value measured on the chip. If there is a difference between the two reception maximum gain values, calibration data for correcting the difference, i.e., a compensation value is determined.

After that, in step 509, offset values for transmission and reception gain steps are determined. Unlike the first calibration, measurement for all gain steps is not performed, and an offset value for a difference between the first calibration and the second calibration to be commonly applied to all gain steps is determined. For example, after a control block of the modem performs measurement for any one gain step, the control block calculates a variance of a gain value compared to the maximum gain value measured in step 507. If the calculated variance and a variance measured in the first calibration are different from each other, the control block determines at least one offset value corresponding to a difference of a variance for a transmission signal or a reception signal. The extent of the gain can be measured as a Root Mean Square (RMS). The offset value is identically applied to all gain steps.

Figure 6:
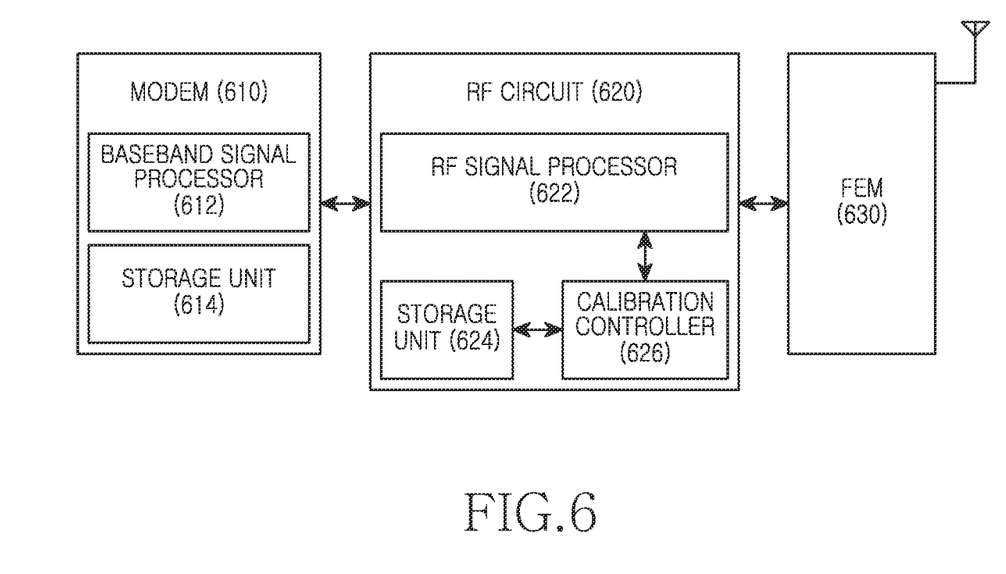
FIG. 6 is a block diagram illustrating a construction of a communication device according to an exemplary embodiment of the present invention.

FIG. 6 is a block diagram illustrating a construction of a communication device according to an exemplary embodiment of the present invention.

Referring to FIG. 6, the communication device includes a modem 610, an RF circuit 620, and a Front End Module (FEM) 630.

The modem 610 converts data into a baseband signal and provides the baseband signal to the RF circuit 620. Also, the modem 610 converts a baseband signal provided from the RF circuit 620, into data. The modem 610 is composed of a digital circuit. That is, a baseband signal processor 612 within the modem 610 performs modulation and demodulation of a signal, generation and analysis of an I-channel signal and a Q-channel signal and the like. The modem 610 includes a storage unit 614. The storage unit 614 stores calibration data. According to an exemplary embodiment of the present invention, the storage unit 614 can store calibration data determined through second calibration. According to another exemplary embodiment of the present invention, the storage unit 614 can store calibration data determined through second calibration and calibration data determined through first calibration. In this case, upon booting of the communication device, the modem 610 provides the calibration data determined through the first calibration and stored in the storage unit 614, to the RF circuit 620. According to another exemplary embodiment of the present invention, the modem 610 can further include, although not illustrated in FIG. 6, a controller performing an operation for compensation using calibration data. Also, the controller can perform the calibration procedure illustrated in FIG. 5.

The RF circuit 620 converts a digital baseband signal provided from the modem 610 into an analog signal, and performs processing at an RF band. Also, the RF circuit 620 performs processing at an RF band for a received RF signal, converts the RF signal into a digital signal, and provides the digital signal to the modem 610. The RF circuit 620 includes an RF signal processor 622. The RF signal processor 622 includes at least one of a DAC, an ADC, a filter, a gain control element, an oscillator, and a mixer. Particularly, the RF circuit 620 includes a storage unit 624 storing calibration data. According to an exemplary embodiment of the present invention, the calibration data can be stored in the storage unit 624 at the time of fabrication of the communication device. According to another exemplary embodiment of the present invention, upon booting of the communication device, the storage unit 624 can receive the calibration data from the modem 610. Also, the RF circuit 620 includes a calibration controller 626 for performing calibration and compensating a signal according to the calibration data. The RF circuit 620 can further include, although not illustrated in FIG. 6, an RF register for generating a physical signal controlling RF elements included in the RF signal processor 622. Also, the RF circuit 620 can further include a feedback path for providing the calibration controller 626 with a result of processing the reference signal generated in the calibration controller 626, in the RF signal processor 622.

According to an exemplary embodiment of the present invention, the calibration controller 626 can perform calibration during a process of fabricating the communication device. According to another exemplary embodiment of the present invention, the calibration controller 626 can perform the calibration during an operation of the communication device. For example, the calibration performed during the operation of the communication device can be triggered by meeting a predefined condition (e.g., an instruction, a temperature, the lapse of a constant period and the like). If calibration data is determined through the calibration during the operation of the communication device, the calibration controller 626 stores the calibration data in at least one of the storage unit 624 within the RF circuit 620 and the storage unit 614 within the modem 610. Or, the calibration data can be transmitted to the external server.

According to an exemplary embodiment of the present invention, the calibration controller 626 compensates a signal transceived during the operation of the communication device, by using the calibration data stored in the storage unit 614. Here, a target of compensation includes at least one of a transmission signal, a reception signal, and a control signal controlling an element within the RF signal processor 622. In other words, the calibration controller 626 controls at least one of a magnitude and a phase of at least one of a transmission signal and a reception signal, by using a compensation value included in the calibration data in order to compensate for a distortion generated in the RF signal processor 622. For example, according to a required oscillation frequency, the calibration controller 626 compensates a voltage value inputted to a VCO and, according to a required amount of gain, the calibration controller 626 compensates a value of a transmission signal and a value of a reception signal.

The FEM 630 transmits an RF signal by a wireless channel through an antenna, and receives an RF signal by the wireless channel through the antenna. The FEM 630 can include a duplexer, a Power Amplifier (PA), a Low Noise Amplifier (LNA) and the like.

Figure 7:
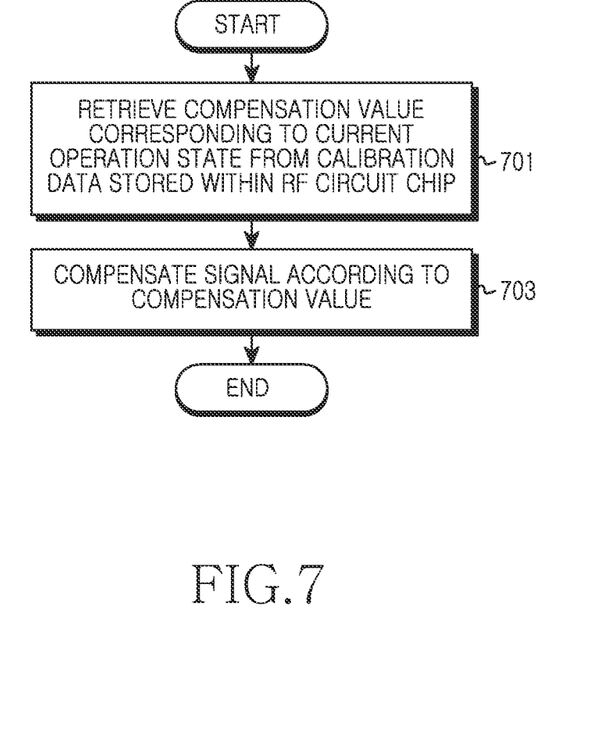
FIG. 7 is a flowchart illustrating an operation procedure of a communication device according to an exemplary embodiment of the present invention.

FIG. 7 illustrates an operation procedure of a communication device according to an exemplary embodiment of the present invention.

Referring to FIG. 7, in step 701, the communication device retrieves a compensation value corresponding to a current operation state, from calibration data stored in an RF circuit chip. The compensation value includes a compensation value for an input voltage according to an oscillation frequency of a VCO, a compensation value for a transmission signal or a reception signal according to an amount of gain, and the like. The calibration data is defined by band, mode, or standard supported by the communication device. That is, the communication device determines at least one compensation value corresponding to a current operation state (e.g., an oscillation frequency, a gain control extent and the like) among calibration data corresponding to a current operation band, a mode, or a standard.

After retrieving the compensation value corresponding to the current operation state in step 701, the communication device proceeds to step 703 and compensates a signal according to the retrieved compensation value. In other words, the communication device controls at least one of a magnitude and a phase of at least one of a transmission signal and a reception signal, by using the compensation value so as to compensate for a distortion generated in the RF circuit. For instance, the communication device controls at least one of a phase of a transmission signal and a magnitude thereof according to the compensation value. For example, the communication device controls at least one of a phase of a reception signal and a magnitude thereof according to the compensation value. For example, the communication device controls an input power value of a VCO according to the compensation value.

According to another exemplary embodiment of the present invention, although not illustrated in FIG. 7, the communication device can store calibration data, which is stored in a modem upon initial booting, in a storage unit within the RF circuit chip. In this case, the storage unit within the RF circuit chip can be a volatile memory.

Also, the communication device can determine whether a predefined condition (e.g., an instruction, a temperature, the lapse of a constant period and the like) is met during operation and, if the condition is met, perform calibration for the RF circuit. At this time, the calibration, which is an RF circuit self-calibration, is performed using a signal generated in the RF circuit, and even signal analysis is performed within the RF circuit. In this case, the communication device stores calibration data determined through the calibration, in a storage unit within a modem or a storage unit within the RF circuit. Or, the communication device can transmit the calibration data to an external server.

By performing most of calibration for an RF circuit before the RF circuit is installed in an MS, in a state of minimizing the uncertainty of the RF circuit, the RF circuit is installed in the MS, and an item of calibration performed in an MS state is greatly reduced. This results in a cost and time savings for the calibration. Also, the calibration data determined through an independent RF-circuit calibration is stored in the external server, and only data for a standard, a mode, and a band supported by an MS in which the RF circuit is to be installed is downloaded, thereby minimizing a size of an RF circuit chip.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method of calibration for a Radio Frequency (RF) circuit in a communication device, the method comprising:
   generating calibration data by performing a first calibration for the RF circuit in state where the RF circuit is not connected with a modem;
   applying a part of the calibration data to the RF circuit; and
   determining at least one offset value by performing a second calibration in a state where the RF circuit is connected with the modem,
   wherein the at least one offset value is determined based on a difference between a first output of the RF circuit not connected with the modem and a second output of the RF circuit connected with the modem.

2. The method of claim 1, wherein the generating of calibration data comprises generating compensation values for all frequency bands, and
   wherein the part of the calibration data comprises compensation values for at least one frequency band supported by the communication device.

3. The method of claim 1, wherein the generating of calibration data comprises:
   generating a reference signal within the RF circuit; and
   determining at least one compensation value by using the reference signal passing through at least one RF circuit element.

4. The method of claim 3, wherein the determining of the at least one compensation value comprises determining a compensation value for an error caused by at least one of a Transmitter/Receiver (TX/RX) gain step error, a TX/RX In-phase/Quadrature-phase (IQ) mismatch, a TX Local Oscillator (LO) feed-through, an RX Direct Current (DC)-offset, and a Voltage Controlled Oscillator (VCO).

5. The method of claim 1, further comprising:
   storing the calibration data in an external storage unit; and
   downloading, to the communication device, the part of the calibration data.

6. A method of calibration for a Radio Frequency (RF) circuit in a communication device, the method comprising:
   generating calibration data for a plurality of frequency bands by performing a first calibration for the RF circuit in state where the RF circuit is not connected with a modem;
   providing the calibration data to an external storage unit;
   receiving a part of the calibration data for at least one frequency band included in the plurality of frequency bands; and
   determining at least one offset value by performing a second calibration in a state where the RF circuit is connected with the modem,
   wherein the at least one offset value is determined based on a difference between a first output of the RF circuit not connected with the modem and a second output of the RF circuit connected with the modem.

7. The method of claim 6, wherein the generating of the calibration data comprises:
   generating a reference signal within the RF circuit; and
   determining at least one compensation value by using the reference signal passing through at least one RF circuit element.

8. The method of claim 6, wherein the generating of the calibration data comprises determining a compensation value for at least one of a Transmitter/Receiver (TX/RX) gain step error, a TX/RX In-phase / Quadrature-phase (IQ) mismatch, a TX Local Oscillator (LO) feed-through, an RX Direct Current (DC)-offset, and a Voltage Controlled Oscillator (VCO).

9. A method of managing calibration data for a communication device, the method comprising:
   receiving calibration data, generated by performing a first calibration for a Radio Frequency (RF) circuit in state where the RF circuit is not connected with a modem, for a plurality of frequency bands;
   storing the calibration data; and transmitting a part of the calibration data for at least one frequency band included in the plurality of frequency bands,
wherein the part of the calibration data is used for determining at least one offset value by performing a second calibration in a state where the RF circuit is connected with the modem, and
wherein the at least one offset value is determined based on a difference between a first output of the RF circuit not connected with the modem and a second output of the RF circuit connected with the modem.

10. A method of calibration for a Radio Frequency (RF) circuit in a communication device, the method comprising:
receiving calibration data generated by performing a first calibration for the RF circuit in state where the RF circuit is not connected with a modem, from an external storage unit;
applying a part of the calibration data to the RF circuit; and
determining at least one offset value by performing a second calibration data in a state where the RF circuit is connected with the modem,
wherein the at least one offset value is determined based on a difference between a first output of the RF circuit not connected with the modem and a second output of the RF circuit connected with the modem.

11. An operation method of a communication device, the method comprising:
retrieving at least one compensation value corresponding to an operation state; and
by using the compensation value, controlling at least one of a magnitude and a phase of at least one of a transmission signal and a reception signal to compensate for a distortion generated in a Radio Frequency (RF) circuit,
wherein the at least one compensation value is determined based on calibration data generated by performing a first calibration for the RF circuit in state where the RF circuit is not connected with a modem and at least one offset value determined by performing a second calibration in a state where the RF circuit is connected with the modem, and
wherein the at least one offset value is determined based on a difference between a first output of the RF circuit not connected with the modem and a second output of the RF circuit connected with the modem.

12. The method of claim 11, wherein the calibration data comprises a value for at least one frequency band supported by the communication device.

13. The method of claim 11, wherein the calibration data is stored in a storage unit provided within the RF circuit.

14. The method of claim 13, further comprising, upon booting of the communication device, storing in the storage unit the calibration data stored in the modem.

15. The method of claim 11, further comprising, by using a signal generated within the RF circuit, performing a calibration for the RF circuit.

16. A communication device comprising:
a Radio Frequency (RF) circuit configured to generate calibration data by performing a first calibration for the RF circuit in state where the RF circuit is not connected with a modem; and
the modem configured to apply a part of the calibration data to the RF circuit and to determine at least one offset value by performing a second calibration in a state where the RF circuit is connected with the modem,
wherein the at least one offset value is determined based on a difference between a first output of the RF circuit not connected with the modem and a second output of the RF circuit connected with the modem.

17. The device of claim 16, wherein the RF-circuit generates compensation values for all frequency bands, and
wherein the part of the calibration data comprises compensation values for at least one frequency band supported by the communication device in which the RF circuit is to be installed.

18. The device of claim 16, wherein the RF circuit generates a reference signal within the RF circuit, and determines at least one compensation value by using the reference signal passing through at least one RF circuit element.

19. The device of claim 18, wherein the RF circuit determines a compensation value for an error caused by at least one of a Transmitter/Receiver (TX/RX) gain step error, a TX/RX In-phase/Quadrature-phase (IQ) mismatch, a TX Local Oscillator (LO) feed-through, an RX Direct Current (DC)-offset, and a Voltage Controlled Oscillator (VCO).

20. The device of claim 16, wherein the RF circuit stores the calibration data in an external storage unit, and
wherein the modem download, to the communication device, the part of the calibration data.

21. A Radio Frequency (RF) circuit apparatus in a communication device, the apparatus comprising:
a controller configured to control to generate calibration data for a plurality of frequency bands by performing a first calibration for the RF circuit in state where the RF circuit is not connected with a modem,
to provide the calibration data to a server, receive a part of the calibration data for at least one frequency band included in the plurality of frequency bands, and determine at least one offset value by performing a second calibration in a state where the RF circuit is connected with the modem,
wherein the at least one offset value is determined based on a difference between a first output of the RF circuit not connected with the modem and a second output of the RF circuit connected with the modem.

22. The apparatus of claim 21, wherein the controller generates a reference signal within the RF circuit, and determines at least one compensation value by using the reference signal passing through at least one RF circuit element.

23. The apparatus of claim 21, wherein the calibration data comprises a compensation value for at least one of a Transmitter/Receiver (TX/RX) gain step error, a TX/RX In-phase/Quadrature-phase (IQ) mismatch, a TX Local Oscillator (LO) feed-through, an RX Direct Current (DC)-offset, and a Voltage Controlled Oscillator (VCO).

24. An apparatus for managing calibration data for a communication device, the apparatus comprising:
a storage unit configured to store calibration data, generated by performing a first calibration for a Radio Frequency (RF) circuit in state where the RF circuit is not connected with a modem, for a plurality of frequency bands; and
a communication unit configured to receive the calibration data, and transmit a part of the calibration data for at least one frequency band included in the plurality of frequency bands,
wherein the part of the calibration data is used for determining at least one offset value by performing a second calibration in a state where the RF circuit is connected with the modem, and
wherein the at least one offset value is determined based on a difference between a first output of the RF circuit not connected with the modem and a second output of the RF circuit connected with the modem.

25. A modulator/demodulator (modem) apparatus for a communication device, the apparatus comprising:
- a storage unit configured to store calibration data generated by performing a first calibration for the RF circuit in state where the RF circuit is not connected with a modem, from an external server;
- a controller configured to apply a part of the calibration data to the RF circuit and to determine at least one offset value by performing a second calibration data in a state where a Radio Frequency (RF) circuit is connected with the modem,
- wherein the at least one offset value is determined based on a difference between a first output of the RF circuit not connected with the modem and a second output of the RF circuit connected with the modem.

26. A communication device comprising:
- a storage unit configured to store calibration data that is determined through a calibration implemented independently of a Radio Frequency (RF) circuit provided in the communication device; and
- a controller configured to retrieve at least one compensation value corresponding to an operation state and, by using the compensation value, control at least one of a magnitude and a phase of at least one of a transmission signal and a reception signal to compensate for a distortion generated in a Radio Frequency (RF) circuit,
- wherein the at least one compensation value is determined based on calibration data generated by performing a first calibration for the RF circuit in state where the RF circuit is not connected with a modem and at least one offset value determined by performing a second calibration in a state where the RF circuit is connected with the modem, and
- wherein the at least one offset value is determined based on a difference between a first output of the RF circuit not connected with the modem and a second output of the RF circuit connected with the modem.

27. The device of claim 26, wherein the calibration data comprises a value for at least one frequency band supported by the communication device.

28. The device of claim 26, wherein the storage unit is provided within the RF circuit.

29. The device of claim 28, further comprising the modem for, upon booting of the communication device, storing in the storage unit the calibration data stored in the modem.

30. The device of claim 26, wherein the controller, by using a signal generated within the RF circuit, performing calibration for the RF circuit.

* * * * *